United States Patent [19]

Andrada Galan et al.

[11] Patent Number: 4,853,866
[45] Date of Patent: Aug. 1, 1989

[54] METHOD AND APPARATUS FOR MATCHING PANELS TO BE CUT FROM PATTERNED FABRICS

[75] Inventors: Mario Andrada Galan; Antonio Romero Lledo; Vincente Calzado Requena, all of Madrid, Spain

[73] Assignee: Investronica S.A., Madrid, Spain

[21] Appl. No.: 27,817

[22] Filed: Mar. 19, 1987

[30] Foreign Application Priority Data

Apr. 2, 1986 [ES] Spain .................................. 553.646

[51] Int. Cl.$^4$ .......................................... G06F 15/00
[52] U.S. Cl. .................................. 364/470; 33/17 A; 2/243 B; 364/474.35; 364/474.37
[58] Field of Search ................ 364/470, 475, 167-171, 364/474; 33/17 A; 2/243 B

[56] References Cited

U.S. PATENT DOCUMENTS

| | | | |
|---|---|---|---|
| 3,715,945 | 3/1973 | Mochizuki et al. | 83/71 |
| 3,761,675 | 9/1973 | Mason et al. | 364/470 X |
| 3,769,488 | 10/1973 | Hasslinger | 364/470 |
| 4,583,181 | 4/1986 | Gerber et al. | 364/470 |
| 4,675,253 | 6/1987 | Bowditch | 33/17 A X |
| 4,677,564 | 6/1987 | Paly et al. | 364/470 X |

FOREIGN PATENT DOCUMENTS

993705  6/1965  United Kingdom .

Primary Examiner—Allen MacDonald
Attorney, Agent, or Firm—Wenderoth, Lind & Ponack

[57] ABSTRACT

A matching method and apparatus for the automatic cutting of patterned fabrics by an integrated marking and cutting system first defines matching points in each of the patterns of panels to be cut and digitizes these points so that the coordinates and respective identification codes for each of the points are recorded in a memory. Matching relationships are then defined for the matching points which unequivocally fix the position which the design must be in at each of the matching points and digitizes and records these relationships in the memory. Separation margins between the panels in their distribution are then established either automatically or interactively on the basis of the previously defined matching relationships and a vision sensor is then automatically positioned over the spread patterned fabric which is to be cut in the positions of the matching points which have been defined for each one of the panels which have been distributed for cutting. The relative design position with respect to a reference position at each of the matching point positions is then determined and a position correction obtained for each panel with respect to the position initially assigned to each one of the panels to be cut, each position correction being obtained on the basis of the positions of the pattern determined in the previous step and on the basis of the previously defined matching relationships wherein all of the panels which are to be cut are matched prior to proceeding with their cutting operation.

2 Claims, 5 Drawing Sheets

METHOD AND APPARATUS FOR MATCHING PANELS TO BE CUT FROM PATTERNED FABRICS

BACKGROUND OF THE INVENTION

The present invention is directed to a method and apparatus which make it possible to complete the matching of panels to be cut in patterned fabrics. This matching process, which is carried out completely automatically, ensures that the design for each one of the panels to be cut is in its correct position. The method and apparatus can be incorporated into integral automatic fabric cutting systems in such a way as to be usable for the cutting of fabrics with patterns or designs.

The incorporation of this method and apparatus into an integrated marking and cutting system renders all the panels, cut, and with their outline clear and perfectly matched with the others making up the assembly. This makes it possible to avoid costly manual operations for matching or adjustment part by part, by the introduction of all the advantages of flexible and automatic manufacturing systems for cutting of fabrics with designs.

The method and apparatus for matching in the automatic cutting of patterned fabrics, which are the object of this invention, cannot be applied separately. To use this method, the matching apparatus must be available, and this apparatus cannot be used if the method described in these specifications is not applied.

At the present time, computerized integrated systems for the cutting of fabrics are well-known and widely used. These systems usually have a digital processor or computer, which is the central control unit of the remaining sub-systems making them up; a digitizer is used to store in the computer memory the numerical information corresponding to the geometry of the panels or patterns which are to be cut; programs and devices which make it possible to handle all the information which is contained in the computer memory and to form the distribution of the panels which are to be cut; one or more cutting machines, which are numerically controlled and which, in basic terms, consist of a table on which the fabric to be cut is spread, and a head which moves over it, driven by motors which are controlled by the central computer and which is fitted with the appropriate cutting tool (blade, laser, water jet, plasma, etc.).

These systems are described in British Patent No. 993 705 of Derek Parker, U.S. Pat. No. 3,715,945 of Takashi Mochizuki et al., or in Spanish Patent No. 489.476 of Juan Sellabona.

The use of these systems (referred to hereinafter as integrated marking and cutting systems) for the automatic cutting of fabrics has involved considerable improvements in the productivity and utilization of the material to be cut. In the case of the clothing and upholstery industry, for example, the use of such systems has considerably reduced per unit costs (garment or item of furnishing) for each unit manufactured.

However, such systems were not applicable for the cutting of patterned fabrics, e.g. checks, stripes, or a printed motif. The present invention overcomes this problem of application to fabrics with designs. Integrated marking and cutting systems were not applicable for patterned fabrics because of three main reasons:

1 The necessity for the design of the fabric to occupy a given position in the cutting of the different panels. The purpose of this is to ensure a quality finish in the end produce made up by these panels (e.g. in the case of the cutting of fabrics for the clothing industry, a garment), so that the design is continuous or symmetrical in the final product.

2 The non-rigid nature of fabrics means that it is easy for the design to be distorted. Thus, in checked or striped designs, it happens that lines are not completely straight or the size of checks is not constant; in printed patterns, the positions of the motifs are not constant, etc. These distortions make it essential to plan the exact position of the design on the fabric before it is spread. Therefore, it is not possible to distribute the panels in such a way as to ensure that, when the fabric is cut, the design will in all cases be in the correct position.

3 The difficulty created by such distortions in ensuring that, when several layers of fabric are spread superimposed for simultaneous cutting, the design is in the same position in all the layers. This makes it necessary to employ complicated spreading procedures, using needles to pierce the fabrics in order to force the design into the same position. In many cases, these types of special spreading procedures make it impossible to subsequently cut the fabrics automatically, so that it is necessary to cut them, and, as well, to make the prior distribution of the panels with manual processes.

Thus it is that, in the clothing industry, which is one of those benefiting from the invention which is the object of this patent, for the cutting of fabrics with checks, stripes or a printed pattern, it is necessary to ensure that the different panels making up a garment are matched. This is understood to mean that the design of each occupies the correct position which ensures that, in the completed garment, the design will show the continuity and symmetry which is aimed for.

The purpose of this invention is a method and apparatus which make it possible to carry out this matching process automatically. The method and apparatus may be incorporated in integrated automatic fabric cutting systems so as to make them applicable to the cutting of patterned fabrics.

With this method and apparatus, it is possible to cut patterned fabrics completely automatically, rendering the cut panels all with their outlines clean and exactly matched in each case with the others making up the group. This makes it possible to avoid costly manual panel-by-panel matching or adjustment operations, by introducing all the advantages of flexible and automatic manufacturing systems to the cutting of patterned fabrics.

SUMMARY OF THE INVENTION

The method and apparatus for matching for the automatic cutting of patterned fabrics, described here, consists of a series of steps, summarized as follows (also see FIG. 1):

1 In the first place, a series of points—called "matching points"— is defined on each of the patterns of the panels which are to be cut. This is done in such a way that, when these patterns are digitized, these matching points are also digitized and they are each associated with an identification code. In this way, the position and identification of these points is recorded together with the information on the geometry, in the memory of the system.

2 In a second step, the method and apparatus for matching which are the object of this invention provides for the definition of "matching relationships" for each one of these points. These relationships define the position which must be occupied by the design in the different matching points, and they are introduced into the system with the assistances of the corresponding programs, likewise being stored in the memory there. The matching points, together with the matching relationship defined for them, constitute what we may call the "matching information".

3 In this step, the matching method and apparatus foreseen in this invention, contemplate the completion of the distribution of the panels to be cut so that each of these is assigned a position in which they are to be cut, with the aim of maximum utilization of the fabric. This operation is carried out following the standard practice for this type of system (for plain fabrics) with programs and devices which make it possible to distribute entirely automatically or interactively, with the aid of graphic display devices. With the method which is the object of this invention, this operation is carried out in exactly the same way as for plain fabrics, but now with the introduction of a modification by which, when the panels are distributed, certain separation margins must be left between them. These margins depend upon the matching relationship defined for the matching points of which each panel is made up, and allow for the subsequent adjustment of their positions without overlapping.

4 Subsequently, the matching itself is carried out. This makes use of the matching apparatus which is the object of this invention. This apparatus consists of a TV camera which is installed on the cutting machine in such a way that it can capture images from any point of the fabric which has been spread. This camera is connected to a digital image processing unit which, processes the images captured, in order to fix the real position of the design on them. With the matching method which is described here, the camera is positioned over the positions initially occupied by the matching points which are defined on each panel distributed in the previous phase, for cutting. For each of these points, and on the basis of the image captured by the camera there, the real position of the design is exactly fixed. The matching apparatus is connected to the integrated marking and cutting system in such a way as to make it possible to transfer this information from the images to it where this information is processed along with that on the existing matching relationships so as to give an adjustment to the position initially assigned to each panel. This adjustment (in both directions and in orientation) makes it possible to place each panel in the position which guarantees a perfect match.

5 In the final step, the method and apparatus for matching for the automatic cutting of patterned fabrics contemplates the cutting of the panels in the standard form of operation for this type of automatic cutting unit, but with the positions of each one of the panels adjusted in accordance with the indications of the previous phase. This ensures that, on each one of the panels, the design occupies the correct position which provides the matching of the whole assembly. In this way, the clean outline of the panels is cut, so eliminating any subsequent process for manual matching or adjustment.

DESCRIPTION OF THE PREFERRED EMBODIMENT

The method and apparatus for matching for the automatic cutting of patterned fabrics makes it possible to employ integrated automatic marking and cutting systems so that the clean outline can be cut of the different panels so as to ensure that they are matched.

Figure 4:
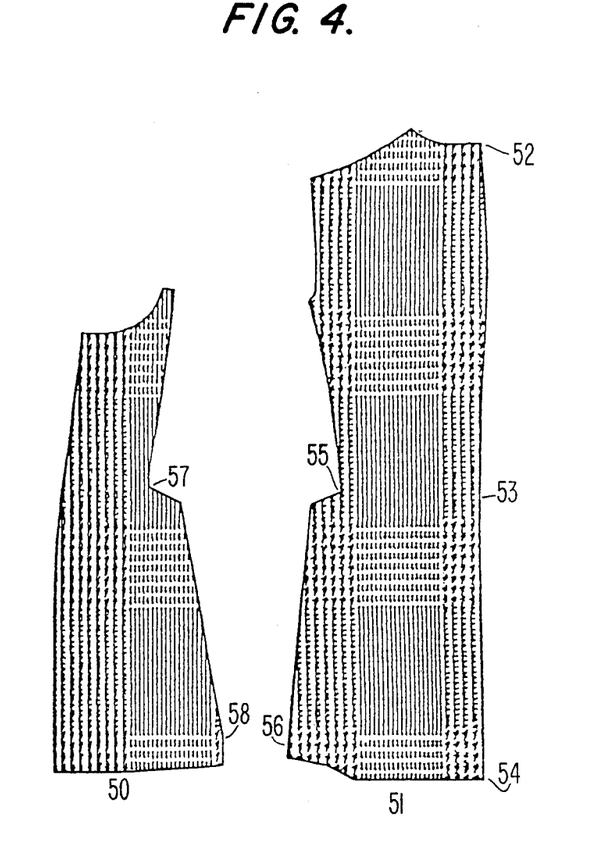
FIG. 4 shows a typical situation in which matching is required of two panels of an article of clothing.

Therefore, the initial step is to define a series of matching points on the patterns for the panels to be cut. FIG. 4 shows an example of two panels, 50 and 51, making up an article of clothing, and for which there is a matching requirement, given that both will be jointed subsequently by a seam at which the pattern must be continuous. On the patterns for these parts, points 52, 53, 54, 55, 56, 57 and 58 are defined so that, when these patterns are digitized in the available integrated marking and cutting system, in other words, when numerical information on the geometry of these panels is introduced into the computer memory, these matching points are like-wise digitized. In addition, each of these points is assigned an identification code so that the computer memory records the relative position of each of these points (their coordinates) and this identification code. This whole operation is shown in step 1 of the diagram in FIG. 1.

Following this, a matching relationship is defined for these matching points, by means of which the form is established in which the panels containing these points are to be matched. The matching relationships defined for a matching point may be of a variety of types, which can be classified into two groups as follows:

1 Absolute matching relationships, when the position of the fabric pattern in respect to this matching point has been fixed finally. For example, in FIG. 4, a relation can be defined for absolute matching for point 52, which establishes that, once the panel has been cut, this point will coincide with a center of symmetry in both directions, x and y, of the pattern (if this is symmetrical).

2 Relative matching relationships, where they define the position which the design must occupy at a matching point according that at some other matching point, which may be in the same or in another panel. For example, in FIG. 4, a relationship can be defined for relative matching for point 57, providing that the position of that pattern at that point is that of point 55, according to the direction which unites both points. Likewise, a relationship can be established for relative matching between points 56 and 58 so that, at both, the pattern occupies the same position (once the panels have been cut). Or it may define a relationship for matching between points 53 and 54, which provides that both must be aligned in respect of the pattern. What is relative in these relationships is that they do not fix a determined point of the pattern occupies the same position, whatever it may be, in one or in both directions or positions which are symmetrical to an axis of symmetry in either direction.

These matching relationships are defined and stored in the central computer memory in the integrated marking and cutting system being used, thanks to the presence of the programs executed there. This operation is shown as step 2 in the diagram in FIG. 1.

Figure 1:
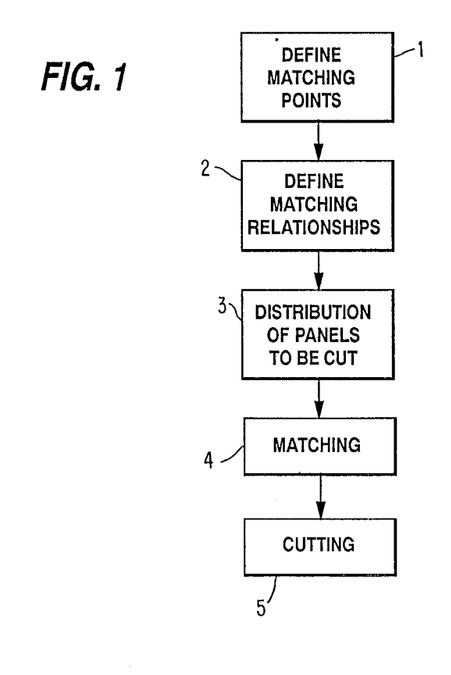
FIG. 1 shows a diagram with the different steps which go to make up the matching method for the automatic cutting of patterned fabrics. These include those from the initial step of definition of the matching points to the cutting of the matched panels.

Once all the panels which are to be cut are digitized in the computer memory, they must be distributed in order to assign each the position in which it is to be cut. This operation is usually known as marking, and may be fully automatic or interactive, with the assistance of the integrated marking and cutting systems usual programs. One of the main purposes of this operation is normally to minimize the amount of fabric which is required for the cutting of all the panels. With the matching method which is the object of this invention, this operation, shown as step 3 in FIG. 1, is carried in a manner which is similar to that for plain fabrics, with the exception that some of the panels which are to be cut are assigned a surrounding safety margin which separates them from the adjacent panels. This margin is fixed on the basis of the matching relationships defined for the existing matching points on that panel, and on the basis of the dimensions of the fabric pattern. This margin is designed, as will be seen, to slightly modify the position of the panel which is assigned such a margin, so as to adjust it to the real position of the pattern of the fabric, thus ensuring that, when the panel is cut, it is exactly matched, and there are no overlaps with adjacent panels. These margins can be assigned automatically or interactively, making use of the corresponding programs for their calculation and allocation in the computer in which the marking is made. As an example of the previous reference in respect of the margins, in the case of panel 51 in FIG. 4, it is seen that, when the marking is carried out, it must be assigned a surrounding margin which allows for subsequent adjustment of its position in order to ensure, as established in the corresponding matching relationship, that point 52 coincides with the center of the design and that, when this adjustment is made, this panel does not intersect with the adjacent ones.

Figure 2:
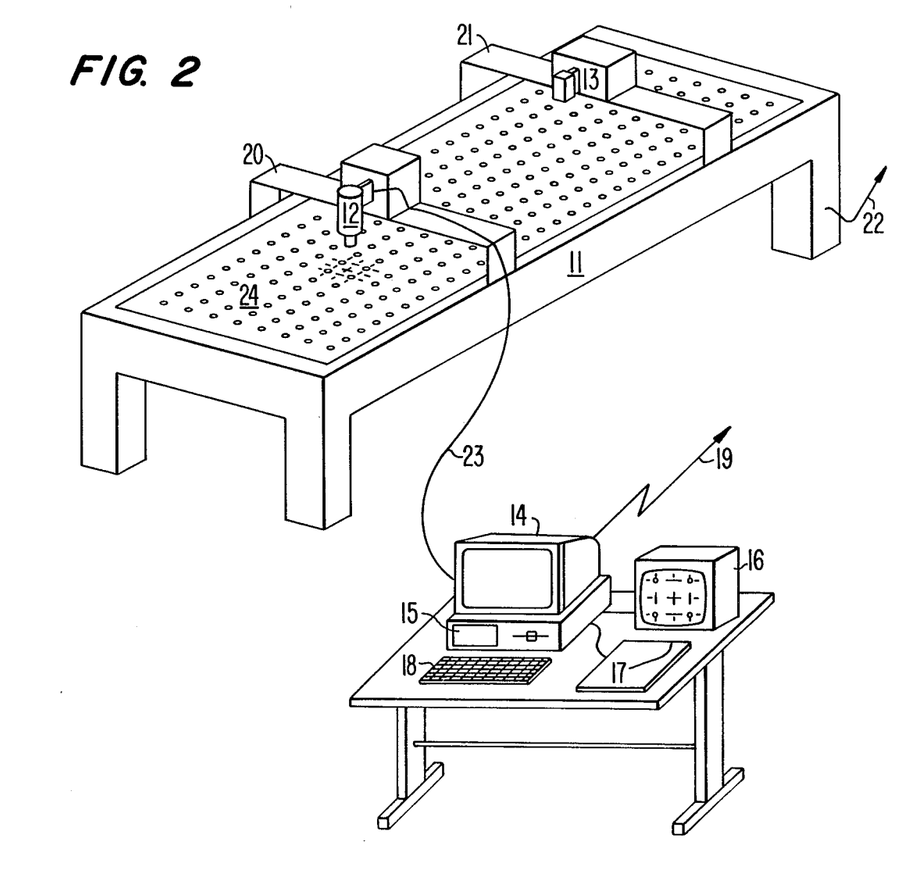
FIG. 2 shows a perspective view of a matching apparatus for the automatic cutting of patterned fabrics designed in accordance with this invention, and incorporated in an automatic cutting machine.
Figure 3:
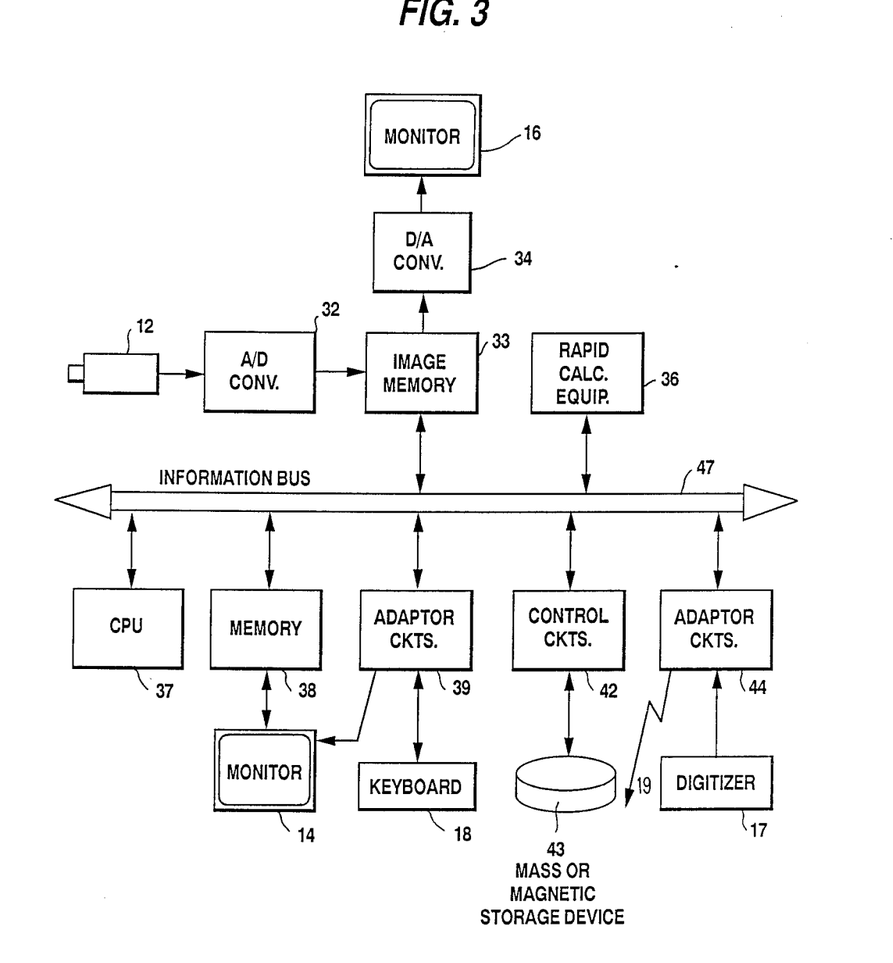
FIG. 3 is a block diagram of a possible configuration of the automatic matching apparatus.

Once the panels have been distributed (marked) and a position is assigned to each (which may be called provisional) along with a margin which separates them one from the other, before they are cut, a matching operation 4 must be carried out with the assistance of the matching apparatus which is shown in FIGS. 2 and 3.

For this operation, the fabric must be spread on the cutting table. If only one fabric is to be cut, it is simply spread, with no further operation, since the negative effect which might arise from any possible distortions in the fabric will be corrected by the matching method and apparatus which is the object of this invention. If, on the other hand, the fabric is spread in superimposed layers all of which are to be cut at the same time, the spreading operation must be carried out using procedures which guarantee that the pattern is in the same position in all the layers. This can be done using established methods and equipment, on the cutting table itself, or on another table from which the fabric is later transferred to the table where it is to be cut. There are well-known devices which assist in this spreading operation and whose operational principle is based on piercing the materials with needles which are arranged for these purposes at given points, so as to align the position of the pattern in all the layers, at those points where the needles are located.

The matching apparatus consists of a TV camera 12 which is installed in the cutting table 11 making up the integrated marking and cutting system to which it is to be incorporated. This camera can be installed as in FIG. 2 on a bridge 20 which is similar to that of the cutting tool 13. This means that, when the electric motors are operated, numerical control can be used to position the camera over any point on the table. Otherwise, in a simpler configuration, the same bridge 21 which carries and moves the cutting tool 13 can be used for the camera installation. In this way, the camera in this configuration would move together with the cutting tool used.

In either configuration, the camera movement along and across the cutting table is controlled by the same computer that controls the movement of the cutting tool during the cutting phase, or else by the matching apparatus itself.

The signal provided by the camera 12 is transmitted by the appropriate electrical connection 23 to the digital image processing equipment which constitutes the main core of the matching apparatus which is the object of this invention. This equipment consists of: a unit 15 where all the electronics are fitted for the system; a monitor 14 for the presentation of the alpha-numerical information on the processes to be carried out; a keyboard 18 for control of the process and the introduction of the data; a monitor 16 for display of the images captured by the TV camera 12 and such graphics as the unit may provide, superimposed upon these images, and a digitizer device for coordinates shown in FIG. 2 by the graphic table 17 but which, in point of fact, can be any standard device which serves this purpose (joy-stick, track-ball, etc.). This matching apparatus has, in addition, a connection 19 to the same computer as that controlling the movement of the head or heads on the cutting table which, usually, will be the main computer of the integrated marking and cutting system used.

By way of illustration, and without limitation, FIG. 3 shows a block diagram of a possible design for this matching apparatus. It will be seen how the signal from the TV camera 12 is digitized by an analog-digital converter 32 and stored in a memory 33 where the image is recorded as numerical information. This recorded image is, in turn, converted into analog information by means of a digital-analog converter 34 and is shown on the monitor 16 for display to the operator supervising the process as a whole. The matching apparatus has, on the other hand, a CPU 37 which is made up of a digital processor and has its own memory 38 for storage of the program and data. It also has adaptor circuits 39 of a suitable type for connection of a keyboard 18 which allows for the introduction of data and commands to the matching apparatus, and to a monitor 14 on which alphanumerical information is presented. The matching apparatus may also have a mass (e.g. —magnetic) storage device (tape, floppy disk, hard disk, etc.) 43 which is connected through the corresponding control circuit 42. This magnetic storage device makes it possible to record programs and data in permanent form. In addition, the matching system has suitable adaptor circuits 44 for the connection of the system to the digitizer device 17 and to the connection line 19 which connects it to the integrated marking and cutting system computer.

All these blocks are interconnected by means of an information bus 47 which makes it possible to transfer information from one element to another. Although it is not necessary for its operation, it is recommended, in order to make the processing faster, that the matching apparatus have some rapid calculation equipment 36 which backs up the CPU 37 in the analysis of the images which are stored in the image memory 33. This rapid calculation device may be made up of an array processor, or else by a rapid co-processor of the type available for this function. The CPU 37 can store data in the image memory 33 and, in this way, the monitor can display the graphic information superimposed on the image captured by the camera 12.

Some of the elements illustrated in FIG. 3 can be implemented by commercially available items. For example, the computer INVES/PC—640—A from Investronica S.A. incorporates the following elements: CPU—37—; memory—38—; monitor—14—; keyboard adapter—39—; keyboard—18—; magnetic disk—43—; disk controller—42—; communications adapter —44—.

The elements: Analog-digital converter—32—, image memory—33— and digital-analog converter—34— can be found in the board DT 2851 frame grabber from Data Translation Inc.

The processor—36— can be implemented with the DT 2858 frame processor board from Data Translation Inc.

The 1370-QM monitor from Sony Corporation can be used as the monitor—16— illustrated in FIG. 3.

The camera or vision sensor—12— can be the KP-181 camera from Hitachi Denshi Ltd.

The graphic tablet—17— can be the Bit-Pad-2 from Summagraphics Inc.

The matching is carried out with this matching apparatus as follows:

The computer of the integrated marking and cutting system determines the position to be occupied by the matching points in the distribution which was made in the previous phase. For each of these matching points marked for cutting, once the fabric has been spread over the cutting table 24, the table is sent the pertinent commands for the positioning of the camera 12 over them. These orders are sent through connection 22. The bridge holding the camera moves so that the positions of the matching points coincide with the center of the camera image.

Once the camera has been placed in the matching point, the computer of the integrated marking and cutting system gives the command to the matching apparatus to process the image captured by the camera and to determine the exact position of the design in the fabric at that point. This command is delivered through connection line 19. The determination of the position of the design can be carried out in two ways:

1 Fully automatic. The matching apparatus contains resources for the processing of the image with capacity for exactly fixing the position of the design which is captured by the camera. This position is determined as a pair of coordinates, x and y, which give the position relative to a reference coordinate. In this way, the matching apparatus determines the position of the pattern completely automatically, and no action by any operator is required.

2 Semi-automatic. There may be cases in which the design in the fabric is so complex that detection programs will not function correctly, or they require too much time to determine their position. In these cases, with the matching apparatus which is the object of this invention, a semi-automatic operating mode can be selected. This involves the monitor 16 in showing the image which is captured by the camera and, superimposed on this, there also appears a graphic cursor or indicator. The operator can control the position of the cursor on the screen with the assistance of the digitizer device 17. In this way, the operator can use the cursor to mark the exact position of the design (or a point of reference for it) on the screen, in place of the image processing resources for this operation for fixing the real position of the pattern.

Figure 5:
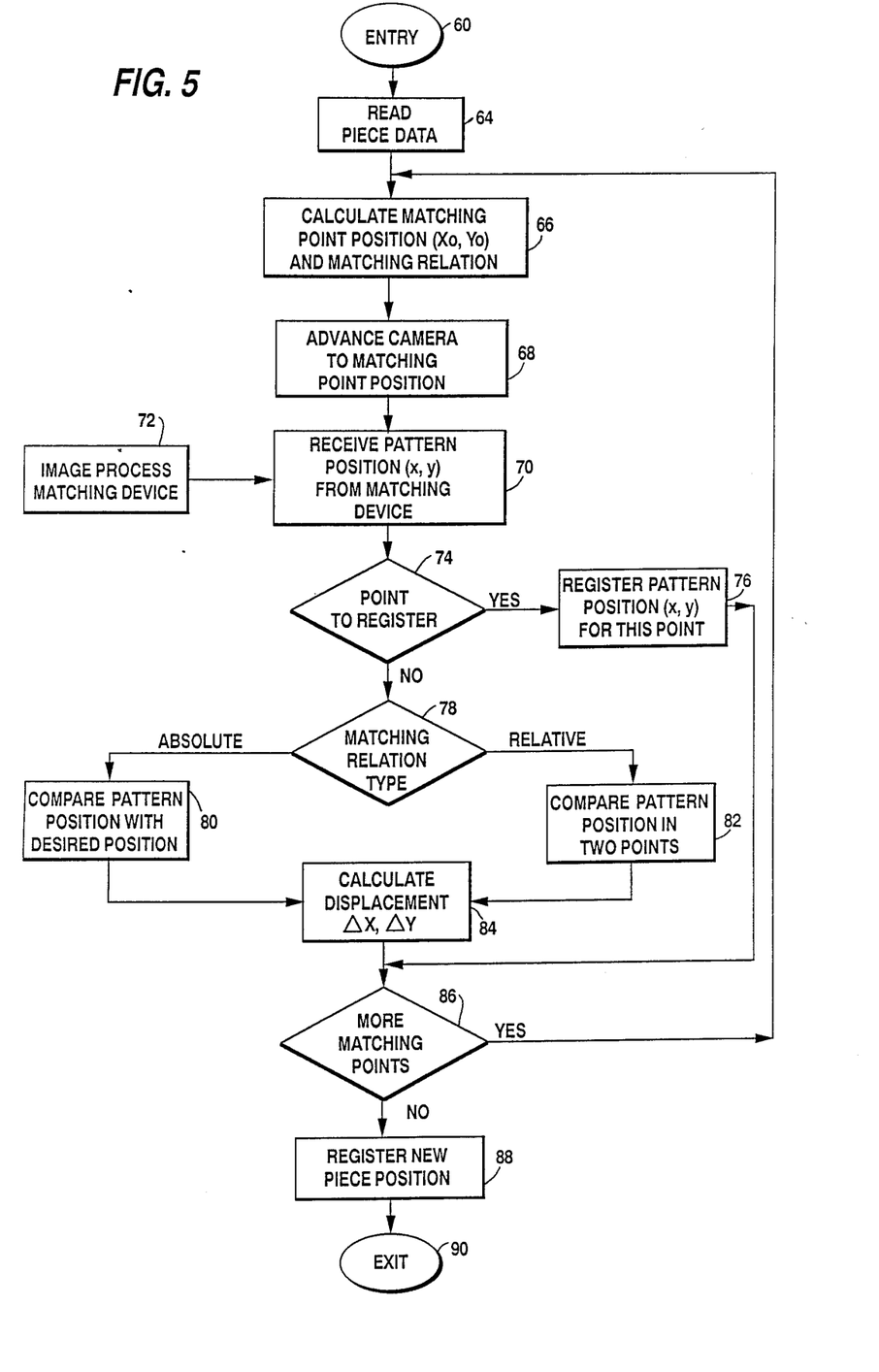
FIG. 5 is a flowchart illustrating a subroutine of a computer program which calculates the new position for a piece in order to satisfy the matching relationships defined for it.

FIG. 5 illuminates the flowchart for a basic matching subroutine which calculates the displacement ($\Delta X$, $\Delta Y$) for a piece relative to its initial position, being this displacement calculated in order to satisfy the matching relationships defined for all the matching points on it. This subroutine must be entered for all of the pieces to be cut, having matching relationships.

The subroutine is entered at 60 and the first operation performed at 64 is to read the data relative to the piece from the storage device. The position (Xp, Yp) of one of the matching points on this piece is then calculated at 66 and the matching relationship defined for this point is determined. Then the adequate command is sent at 68 to the cutting table in order to put the camera, or the vision sensor installed on it, at the matching point position (defined by (Xp, Yp) coordinates). The matching apparatus processes the image acquired by the camera at 72. This process is carried out by a different subroutine represented by its flowchart in FIG. 6. The result of this image processing is received at 70 as a pair of coordinates (x,y) indicating the pattern position relative to a reference position.

An inquiry is made at 74 to determine if the point been processed is just a point to register for later matching operations or a point to match. If it is a point to register, the pattern position at this point is stored at 76 to be available in a later use. If the point is a point to match, a new inquiry is made at 78 to determine the type of matching relationship defined for this point.

If the matching relationship is of the absolute type, this means that this matching point must be in a concrete position in the pattern. So the current pattern position defined by (x,y) is compared with the final desired position. This comparison is made at 80.

If the matching relationship is of the relative type, this means that this matching point must be in the same position (in one or both directions) of another matching point previously registered. So the pattern positions for both points are compared at 82.

Once this comparison (80 or 82) has been made, the subroutine calculates the piece position adjustment needed in order to satisfy the matching relationships defined for this matching point. This is done at 84 and the result of this calculation is represented by a displacement ($\Delta X$, $\Delta Y$) relative to the initial position assigned to the piece.

If the interrogation performed at 86 indicates that there is more matching points for this piece, then the complete process is repeated from 66 until there is no more matching points to process. The final displacement ($\Delta X$, $\Delta Y$) is used at 88 to calculate the new position for this piece. This position satisfies the matching relationships defined for all its matching points and, consequently, is the position where the piece will be cut. The subroutine is then exited at 90.

Figure 6:
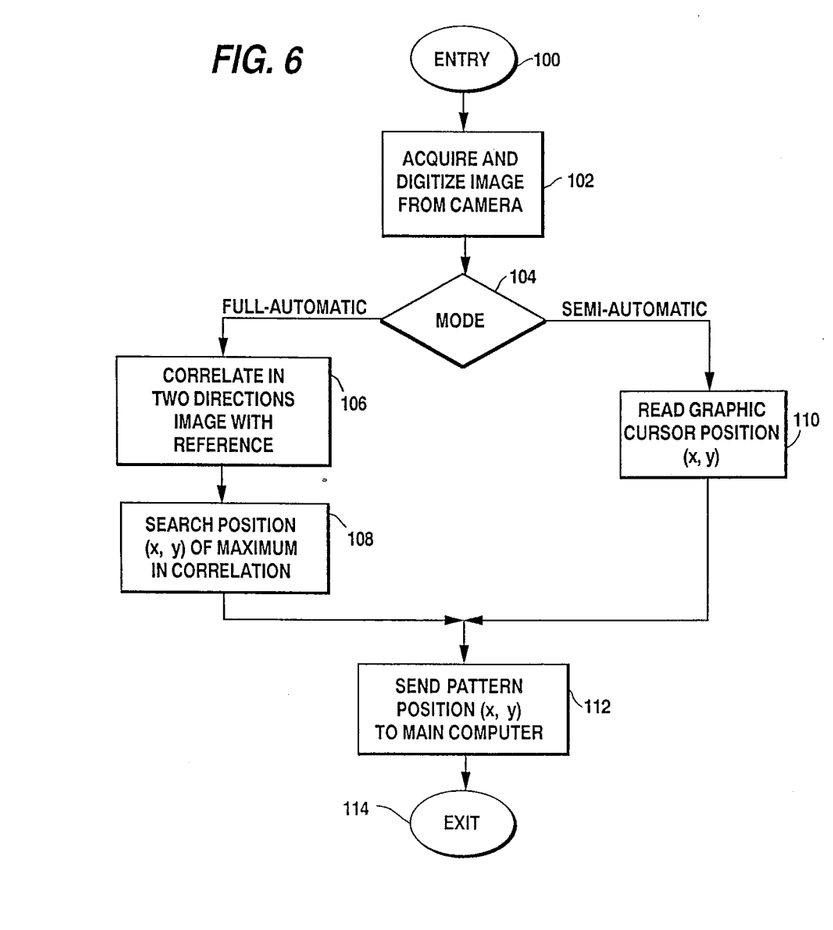
FIG. 6 is also a flowchart illustrating another subroutine of a computer program that provides the position of a pattern in an image as a pair of coordinates relative to a reference position.

FIG. 6 illustrates the flowchart for a basic subroutine which calculates the pattern position in an image acquired by a vision sensor of the matching apparatus. This subroutine must be entered every time that the vision sensor is moved to a matching point position.

The subroutine is entered at 100 and the first operation performed at 102 is to acquire and digitize the image sent by the sensor. This is carried out by means of the analog-digital converter 32. With the digital image stored in the memory 33 of the matching apparatus, an interrogation is performed at 104 to determine if the process will be made in a fully-automatic or semi-automatic way.

If the fully-automatic mode is selected at the matching apparatus, then the digitized image is correlated at 106 with a reference digitized image which has been previously stored in memory. This correlation is performed in two directions. The maximum value of the result of this correlation is searched at 108 to determine the position (x,y) where both images (current and reference) better match.

If the semi-automatic mode is selected, then the matching apparatus does not calculate the position of the pattern, it waits instead until the operator indicates the exact position of the pattern. The operator must indicate this pattern position with a graphic cursor overlaid to the image on the screen of the monitor 14, controlled by means of the digitizer device 17 as explained above.

Once the pattern position has been determined, this position represented by a pair of coordinates is sent at 112 to the main computer where the subroutine illustrated in FIG. 5 is running. The subroutine exits at 114 after sending this information. This subroutine will enter again when the main computer moves the vision sensor to another matching point.

Once the exact position of the pattern for this matching point has been determined, whether fully automatically or semi-automatically, the position is represented as a pair of coordinates (x,y) which give its displacement in relation to any position, which is always the same, considered as reference. This pair of coordinates is transmitted by the connection line 19 from the matching apparatus to the computer of the integrated system for marking and cutting, to which it is incorporated.

The operation is repeated for each of the matching points. In other words, during this matching phase (step 4 in FIG. 1) the fabric spread on the cutting table is not cut, but rather the camera carries out an exploration of the position on it of the matching points defined for each part. For each of these positions, the matching apparatus determines the real position of the pattern, and transmits it to the integrated marking and cutting system. This system has the capacity to process this information from the matching apparatus and, using it and the matching relationships which have been defined, it determines an adjustment of the position for each of the panels which is to be cut. That is, it modifies the distribution made in the previous phase panel-by-panel in order to adapt the panel positions to the pattern in the fabric, so as to meet the matching requirements defined by the matching relationships. This position adjustment is possible thanks to the presence of a margin around each of the pieces to be cut, so that, when their position is modified, there is no overlap or intersection amongst them. The system, as it carries out the matching operation, ensures that the adjustments in position are made within the permitted margins.

Finally, once the position has been corrected or adjusted for each one of the panels in the marking which is to be cut, the integrated marking and cutting system proceeds with the cutting of the panels (step 5 in FIG. 1) in the usual manner for this type of system. This operation requires no intervention from the matching apparatus. The cut is made on the clean outline of the panels, ensuring that they are exactly matched.

If the configuration is as shown in FIG. 2, with a bridge 20 for moving the camera and a further bridge 21 for moving the cutting tool, these two operations for matching and cutting can be carried out simultaneously. In other words, while the matching is being carried out for the marker, the previous marker can be cut (as it will have been matched already). In this way, dead spots can be eliminated in the cutting system, therefore raising the overall productivity of the system.

If, on the other hand, the camera and cutting tool are installed on the same bridge, it is not possible for both these operations to be carried out simultaneously, since the cutting operation cannot be put into effect until the panels have been matched and, therefore, their definitive cutting position has been fixed.

The description of the matching method and apparatus for the automatic cutting of patterned fabrics, as made in these specifications, as well as the figures attached hereto, should be understood to be illustrative and not limiting.

We claim:

1. A matching method for the automatic cutting of patterned fabrics by an integrated marking and cutting system comprising the following steps:
   defining matching points in each of a plurality of patterns of panels to be cut, digitizing these matching points, and recording a set of coordinates and also a respective identification code for each of the digitized points in a memory of the system;
   defining matching relationships for the matching points which unequivocally fix the position which the design must be in at each of the matching points, and digitizing these relationships and recording them in the memory of the integrated marking and cutting system;
   establishing separation margins between the panels, either automatically or interactively, on the basis of the matching relationships which have been defined;
   initially assigning a position to each of the panels to be cut on a spread piece of patterned fabric and distributing said panels to the assigned positions;
   automatically positioning a vision sensor device over the spread patterned fabric which is to be cut, at the positions of said matching points which have been defined for each one of said panels which have been distributed;
   determining a relative design position with respect to a reference position at each of said matching point positions at which said vision sensor is positioned; and
   obtaining a position correction for each panel with respect to the initially assigned position based on said relative design position and said defined matching relationships, wherein all of said panels which are to be cut are matched prior to proceeding with their cutting operation.

2. A matching apparatus for the automatic cutting of patterned fabrics by an integrated marking and cutting system comprising:
- a means for defining matching points in each of a plurality of patterns of panels to be cut, a means for digitizing the matching points, and a means for recording a set of coordinates and also a respective identification code for each of the digitized points in a memory of the system;
- a means for defining matching relationships for the matching points which unequivocally fix the position which the design must be in at each of the matching points, and a means for digitizing these relationships and recording them in said memory of said integrated marking and cutting system;
- a means for establishing separation margins between said panels, either automatically or interactively, on the basis of said matching relationships which have been defined;
- a means for initially assigning a position to each of said panels to be cut on a spread piece of the patterned fabric and for distributing said panels to the assigned positions;
- a means for automatically positioning a vision sensor device over the spread patterned fabric which is to be cut, at the positions of said matching points which have been defined for each one of the said panels which have been distributed;
- a means for determining a relative design position with respect to a reference position at each of said matching point positions at which said vision sensor is positioned; and
- a means for obtaining a position correction for each panel with respect to the initially assigned position based on said relative design position and said defined matching relationships, wherein all of said panels which are to be cut are matched prior to proceeding with their cutting operation.

* * * * *